United States Patent
Morris

(10) Patent No.: US 7,743,554 B2
(45) Date of Patent: Jun. 29, 2010

(54) POTTED PLANT SOIL RETAINER

(76) Inventor: Michele M. Morris, 378 Lions Health Camp Rd., Indiana, PA (US) 15701

( * ) Notice: Subject to any disclaimer, the term of this patent is extended or adjusted under 35 U.S.C. 154(b) by 148 days.

(21) Appl. No.: 12/077,311

(22) Filed: Mar. 18, 2008

(65) Prior Publication Data

US 2009/0235584 A1  Sep. 24, 2009

(51) Int. Cl.
*A01G 9/02* (2006.01)
(52) U.S. Cl. ........................................ 47/65.6
(58) Field of Classification Search ............... 47/65.6, 47/79; 108/156; 248/150; D7/388; D11/153, D11/156, 164
See application file for complete search history.

(56) References Cited

U.S. PATENT DOCUMENTS

| | | | |
|---|---|---|---|
| 475,980 A * | 5/1892 | Holt ........................... 108/156 |
| 515,032 A | 2/1894 | Vestal | |
| 611,523 A * | 9/1898 | Springer ..................... 47/65.6 |
| 1,343,114 A * | 6/1920 | Colson ......................... 99/418 |
| 1,996,898 A * | 4/1935 | Brandell ..................... 47/65.6 |
| 2,084,005 A | 6/1937 | Richards | |
| D160,930 S * | 11/1950 | Duff ............................. D6/484 |
| D246,026 S * | 10/1977 | Stahel ......................... D7/388 |
| D254,765 S * | 4/1980 | Benia ........................... D7/667 |
| D255,555 S * | 6/1980 | Smith ......................... D11/152 |
| D259,762 S * | 7/1981 | Sabin ........................... D7/388 |
| D288,793 S | 3/1987 | Carlson | |
| D300,732 S | 4/1989 | Carlson | |
| 4,860,491 A | 8/1989 | Panuski | |
| 5,099,609 A * | 3/1992 | Yamauchi ..................... 47/81 |
| 5,181,951 A * | 1/1993 | Cosse, Jr. ................... 71/64.11 |
| D352,479 S | 11/1994 | Carlson | |
| 5,375,370 A * | 12/1994 | Zimmerman ............... 47/41.01 |
| 5,448,854 A | 9/1995 | Hirsch et al. | |
| 5,644,868 A * | 7/1997 | Lui ............................... 47/81 |
| 6,125,579 A | 10/2000 | Pavelka | |
| 2002/0014038 A1* | 2/2002 | Masello ......................... 47/79 |
| 2004/0144026 A1 | 7/2004 | Fan | |

* cited by examiner

*Primary Examiner*—Francis T Palo
(74) *Attorney, Agent, or Firm*—James Ray & Assoc

(57) ABSTRACT

For use inside a plant pot having a base section with at least one vertically disposed drain aperture, a drain cover/soil retainer includes a substantially planar main body fixedly attached with glue to at least three leg members of preselected material and of substantially equal height positioned substantially beneath the area covered by the main body. The total volume occupied by the leg members combined is between about 30 and 80 percent of the volume defined by the area under the main body and the leg member height.

6 Claims, 2 Drawing Sheets

POTTED PLANT SOIL RETAINER

FIELD OF THE INVENTION

The present invention relates, in general, to accessories for plant pots and, more particularly, this invention relates to a natural product apparatus for retaining soil in the pot while allowing excess water to drain out.

BACKGROUND OF THE INVENTION

House plants and flowers are commonly grown in soil held in tapered pots made of plastic or terracotta. Watering is done by hand pouring or rain if left outdoors. Excessive water retention can have deleterious effects. Prior to the conception and development of the present invention, pots for growing flowers and other plants have comprehended the advantage of allowing excess water to seep out. Typically the pots will have at least one vertically disposed hole in the bottom surface, and the pot sits in a saucer or shallow tray to prevent liquid from running onto the surrounding supporting surface. However, retention of soil in the pot and prevention of pluggage of drain holes have been problems to overcome. Persons planting the flowers or plants often employ time and expense consuming measures such as first placing a layer or layers of rocks or pebbles in the pot before adding the soil.

An extensive amount of prior art has been disclosed for addressing the aforementioned issues. A series of U.S. Design Patents to Carlson, such as D 288,793, D 300,732, and D 352,479 have provided many configurations for planter inserts fabricated from synthetic material. These generally cover most of the bottom of the pot and have a multitude of holes and slots to enable water to get out even when most of the open are is plugged with dirt. U.S. Pat. No. 5,448,854 discloses a plant container drain insert that engages with the drain hole.

U.S. Pat. No. 515,032 discloses a three-legged false bottom for covering a central drain hole in the bottom of a flower pot. This false bottom is meant to cover nearly the entire cross sectional area near the bottom of the pot, and hence must have a size matching each pot diameter. Also, the legs are very narrow and occupy very little of the volume beneath the false bottom. Thus, the legs offer almost no resistance to migration of soil to the drain hole.

SUMMARY OF THE INVENTION

The present invention provides, for use inside a plant pot having a base section with at least one vertically disposed drain aperture, a soil-retaining drain cover which includes a substantially planar body fixedly attached with glue to at least three leg members of preselected material and of substantially equal height positioned substantially beneath the planar body area. The total volume occupied by the leg members combined is between about 30 and 80 percent of the volume defined by the planar body covered area and the leg member height.

In an alternative embodiment, the legs consist of glass play marbles or spheres glued to the underside. In another embodiment, a soil retaining mesh encircles the leg members.

OBJECTS OF THE INVENTION

It is, therefore, one of the primary objects of the present invention to provide a device for plant pots to retain soil while allowing excess water to drain out.

Another object of the present invention is to provide a drainage insert for plant pots that is made from natural materials.

Still another object of the present invention is to provide a device for allowing water drainage from a plant pot while retaining soil in a manner not prone to plugging with dirt and debris.

Yet another object of the present invention is to provide a plant pot insert that can be manufactured without the high front-end tooling costs typical of injection molded items.

An additional object of the present invention is to provide plant pot drain covers wherein one size can fit a range of pot sizes.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
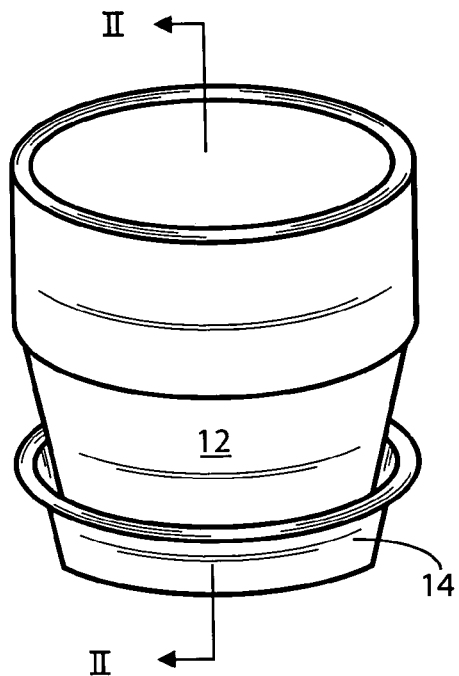
FIG. 1 is a perspective view of a typical plant or flower pot.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Referring initially to FIG. 1, a typical plant pot 12 is shown resting in a saucer tray 14, which surrounds the base and prevents excess water from getting onto the supporting surface. Not shown in this view is a central drain hole in the bottom of the pot 12.

Figure 2:
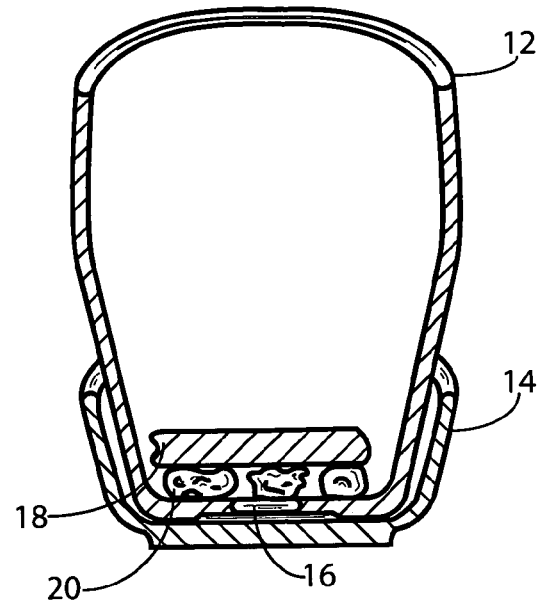
FIG. 2 provides a sectional elevation view of a plant pot with the present invention disposed therein.

FIG. 2 presents a cross-section elevation view of the pot and drain assembly along plane II-II in FIG. 1. The flower pot 12 with a central drain aperture 16 rests in a saucer 14. A substantially planar stone body drain cover 18 is supported off the interior bottom by three smaller stones 20 which are glued to the underside of the top body member 18. Many types of glue would be acceptable, provided they are not susceptible to attach by water and common fertilizers. An Elmer's® wood glue has been found to work well, and epoxy cements will also meet the requirements. While shown here in combination with tapered round-top pots, the present invention would function equally well in elongated rectangular planters with one or more drain hole. Also, it is not necessary that the stone body drain cover 18 extend across nearly all of the cross section of the lower interior of the pot. Thus, one size of drain cover can fit a range of pot sizes.

Figure 3:
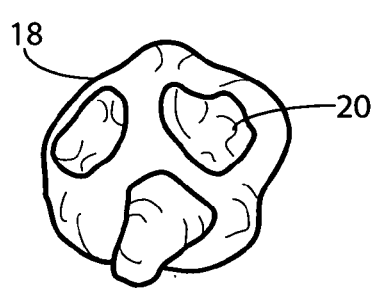
FIG. 3 is a plan view of an inverted drain hole cover.

FIG. 3 is a plan view of an inverted cover assembly 10 showing the bottom. The area bound by the perimeter of the stone body drain cover 18 is referred to herein as the covered area. Three small stone legs 20 of similar height are glued onto the bottom of the substantially planar stone body drain cover 18. It is acceptable if portions of the small stones 20 extend somewhat beyond the perimeter of the stone body drain cover 18. However, the leg members should occupy about 30 to 80 percent of the volume covered by the stone body 18. The volume covered is the product of the covered area of the stone times the average height between the bottom surface of the stone and the surface upon which the legs are resting. This creates passageways to the drain hole that are wide enough to avoid plugging with dirt, but sufficiently deep and tortuous enough to retard flow of soil. If appropriately sized, four small stones could be used as well.

Figure 4:
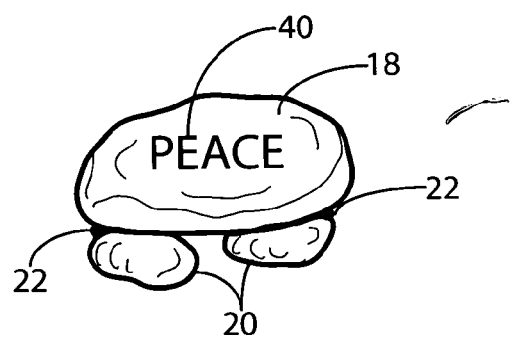
FIG. 4 provides a perspective view of a preferred embodiment of the present invention.

FIG. 4 provides a perspective view of the drain cover top stone 18 resting on and glued to smaller stone legs 20. Small globs of glue 22 surround the contact points of legs 22 with the underside of the flatter main body. The legs may be made of either clay or a natural or synthetic stone. Optionally, words may be inscribed on the top side of the main body stone.

Figure 5:
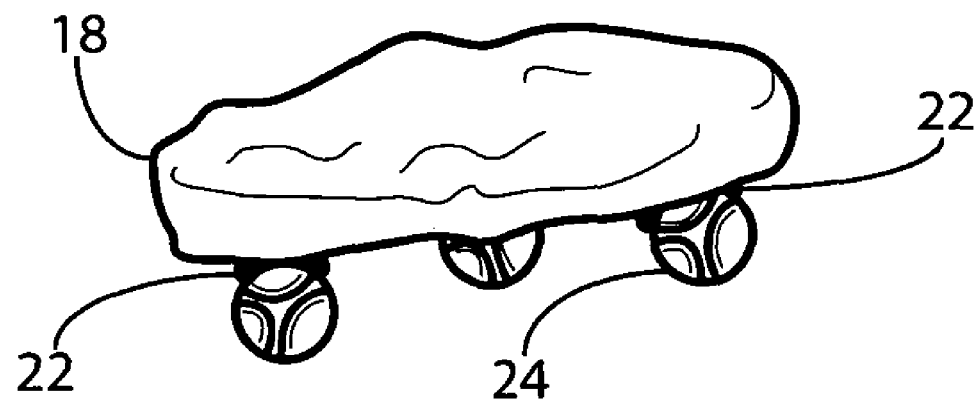
FIG. 5 is a perspective view of the present invention with an alternative style of legs.

FIG. 5 depicts an alternative embodiment of the present invention with a different style of legs. In this example, the planar stone body drain cover 18 is supported on three or more spherical play marbles 22, typically made of partially colored glass. As the size of the main stone body drain cover 18 permits, more than three marbles would be preferable to better create tortuous paths from the perimeter to the drain hole. As described above, the marble legs will occupy between about 30 to 80 percent of the volume covered by the stone body 18. At the tangential contact points, globs of glue 22 hold the pieces securely together. An epoxy adhesive would be preferred in this case, but numerous others would work satisfactorily.

Figure 6:
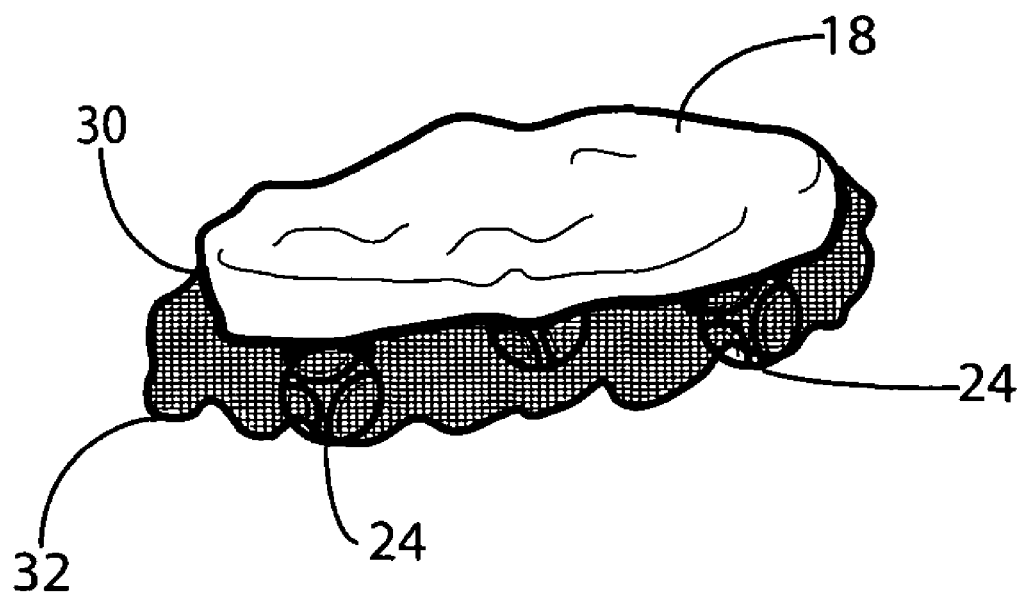
FIG. 6 is a perspective view of an alternative embodiment of the present invention.

FIG. 6 present a perspective view of an alternative embodiment of the present invention, one with an outer mesh 32 surrounding the legs to add another way to hold back soil. It can be held in place by an elastic band 30, or by other methods.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

What is claimed is:

1. A soil-retaining drain cover for use inside a plant pot having a base section including at least one vertically disposed drain aperture, said drain cover comprising:
   a. a substantially planar body of first preselected material defining an upper surface, a lower surface, and a covered area;
   b. at least three leg members of a second preselected material and of substantially equal height positioned substantially beneath said covered area, wherein total volume occupied by said leg members combined is between about 30 and 80 percent of volume defined by said covered area and said leg member height;
   c. an attachment means at contact points between said lower surface and said leg members for fixedly connecting said leg members to said lower surface; and
   d) a mesh encircling an outermost perimeter of said leg members.

2. The plant pot drain cover, according to claim 1, wherein said second preselected material is one of natural stone, synthetic stone, dried clay, and marble.

3. The plant pot drain cover, according to claim 1, wherein said second preselected material of said leg members is glass spheres.

4. The plant pot drain cover, according to claim 1, wherein said second preselected material of said leg members is synthetic stone.

5. The plant pot drain cover, according to claim 1 wherein said attachment means is water-resistant glue.

6. The plant pot drain cover, according to claim 5, wherein said water-resistant glue is epoxy adhesive.

* * * * *